Patented Apr. 1, 1924.

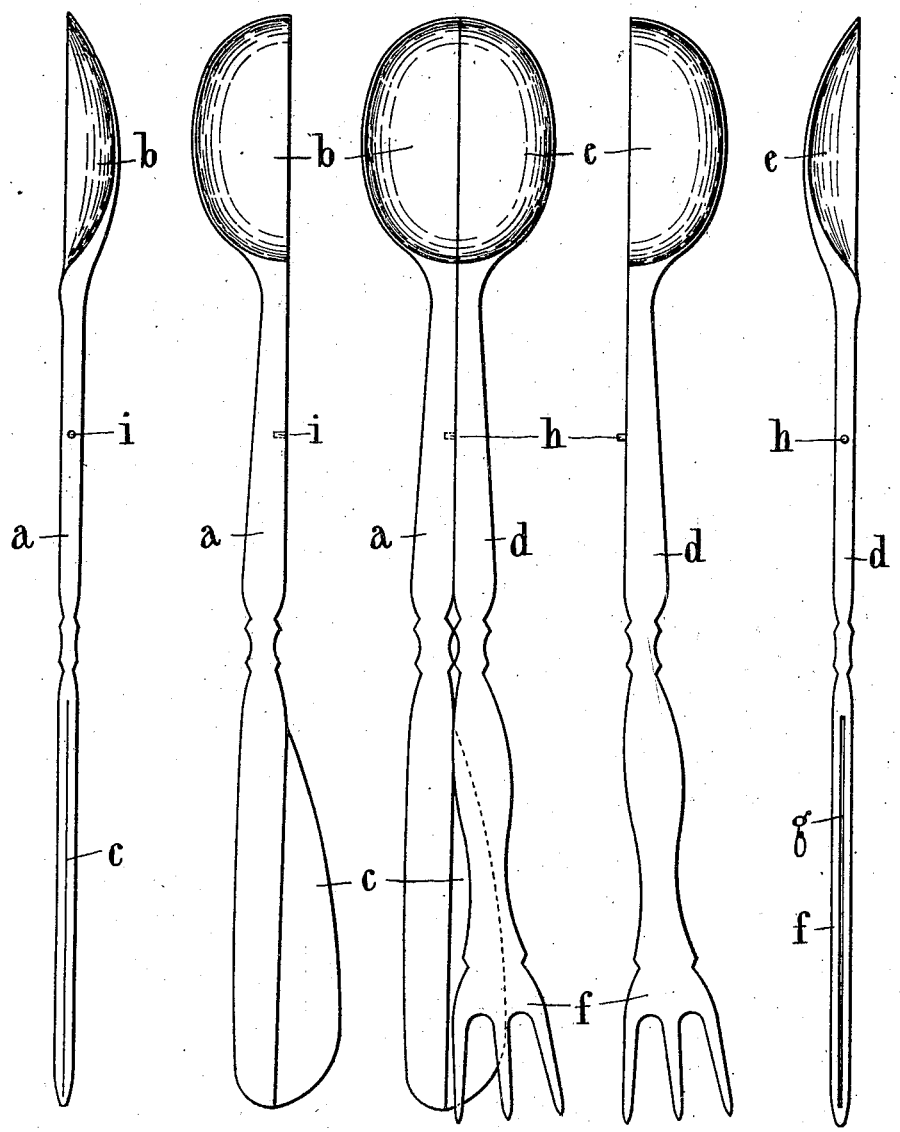

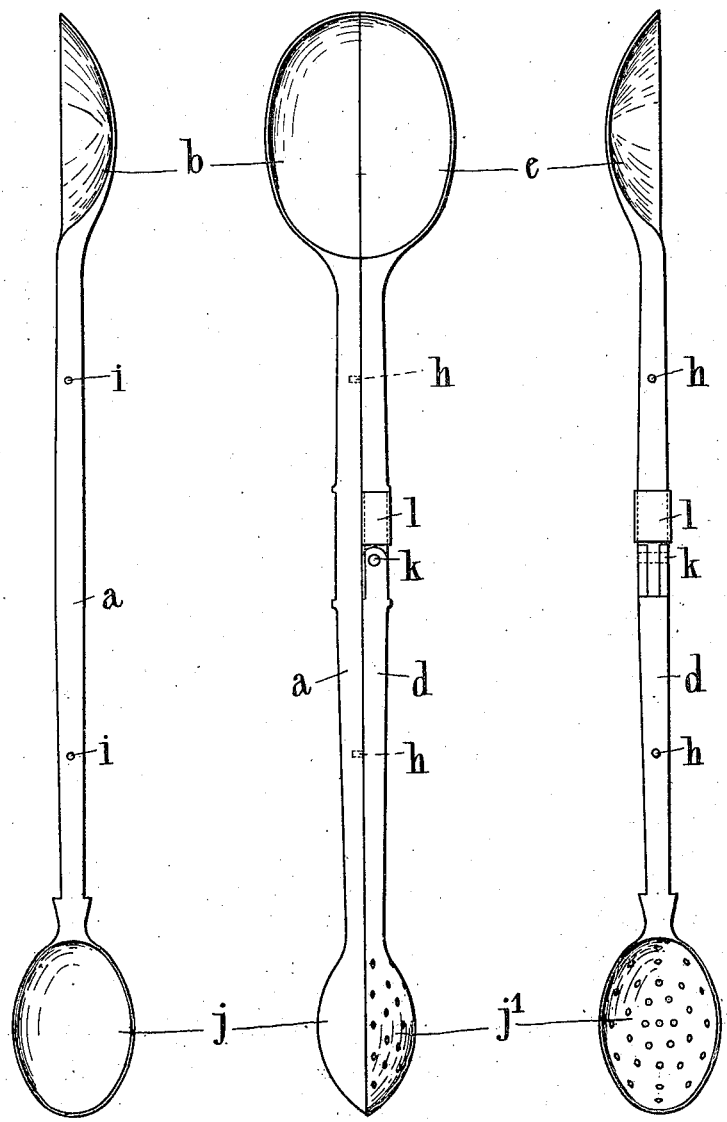

1,488,463

UNITED STATES PATENT OFFICE.

EDMUND WILLIAM ABRAM, OF LONDON, ENGLAND.

COMBINATION TABLE UTENSIL.

Application filed November 17, 1921. Serial No. 515,955.

*To all whom it may concern:*

Be it known that I, EDMUND WILLIAM ABRAM, a British subject, residing at 3 Lansdowne Road, Holland Park, London, England, have invented certain new and useful Improvements in Combination Table Utensils, of which the following is a specification.

This invention has reference to improvements in combination table utensils, and it consists in a combination table utensil in the form of a spoon divided longitudinally of its bowl and handle into two equal parts, the two halves being adapted to be detachably engaged with each other, and each of the two handle portions being provided at its free end with a table utensil such as a knife-blade, fork-prongs, a spoon or the like, so that the complete device, consisting of only two parts, comprises a complete spoon, two half-spoons which serve for stirring and some other purposes, and two other table utensils such as a knife and a fork, each provided with a handle.

I have illustrated my invention in the accompanying drawing, in which:

Fig. 1 shows in plan view the two parts of the device placed side by side and engaged with each other to constitute a spoon, the free end of the handle portion of one part being provided with a knife-blade and the other with fork-prongs;

Figs. 2 and 3 show the two parts detached from each other;

Figs. 4 and 5 are edge views of Figs. 2 and 3 respectively;

Fig. 6 shows a divided spoon with an approximately semi-spherical shell or spoon-bowl formed on the free end of each portion of the handle, one of the handle portions being jointed midway of its length so that the said shells may be readily used as a sugar-tongs, and one of the shells being perforated to serve as a sugar-sifter; and Figs. 7 and 8 are edge views of the two parts shown in Fig. 6.

As shown in Fig. 1, the complete device consists of a spoon divided longitudinally of its bowl and handle into two equal parts, the end portion of one half of the handle being formed or provided with a knife blade and the end portion of the other half of the handle being formed or provided with fork prongs.

The part of the device shown in Figs. 2 and 4 consists of a handle portion $a$ formed integrally with a half-spoon $b$ at one end and provided at its other end with a knife blade $c$; and the part shown in Figs. 3 and 5 consists of a handle portion $d$ formed integrally with a half-spoon $e$ at one end and a fork $f$ at its other end. The portion of the handle $d$ which constitutes the stem of the fork has a recess or slot $g$ formed in it to receive the knife blade, and is provided with a pin $h$ which fits into a hole $i$ formed in the handle $a$. The said slot $g$ is shown as extending into the prongs of the fork, but of course the length of the knife blade may be such that the slot need not extend beyond the stem of the fork. An alternative arrangement for protecting a short knife blade is to make the three prongs of the fork sufficiently long to permit of displacing them relatively to each other so that the middle prong lies in a plane parallel to but slightly in front of or behind the plane in which the other two prongs are located and the blade may be engaged between the two planes.

The two half-spoons $b$ and $e$ serve for stirring and some other purposes equally as well as a whole spoon, and I find in practice that a perfectly close fit at the joint is not essential to provide a spoon which will hold a liquid as thin as water.

In the construction illustrated in Figs. 6, 7 and 8 a spoon bowl $j$, $j'$ formed on the free end of each of the handle portions $a$ and $d$, one of the said bowls $j'$ being perforated to serve as a sugar sifter, and the handle $d$ being jointed at $k$ so that the two bowls (which fit face to face) may be readily utilized as a sugar-tongs. A sleeve $l$ which is slidable on the handle $d$ serves to lock the joint.

What I claim is:

1. A combination table utensil in the form of a spoon divided longitudinally of its bowl and handle into two equal parts, the two parts being adapted to be detachably engaged side by side with each other to constitute a spoon and each of the two handle portions being provided at its free end with an additional table utensil, so that the two parts constitute a complete spoon, two half spoons and two additional table utensils each provided with a handle.

2. A combination table utensil in the form of a spoon divided longitudinally of its bowl and handle into two equal parts, the two parts being adapted to be detachably engaged with each other to constitute a spoon, the handle portion of the one half being provided with a knife blade and the handle portion of the other half being provided with fork prongs, and the said latter handle portion being slotted to receive and form a guard for the cutting edge of the knife blade.

3. A combination table-utensil consisting of a spoon divided longitudinally of its bowl and handle into two equal parts which are adapted to be detachably engaged with each other, and a spoon bowl formed on the free end of each of the handle portions of the said parts so that the two bowls fit face-to-face against each other when the two parts are engaged with each other.

4. A combination table utensil formed in two separable parts, each part constructed to be detachably engaged with the other part side by side and each part having a half spoon at one end and a table utensil at the other end, the half spoon portions of each part forming a handle when said part is used singly as a table utensil and when the two parts are detachably engaged the two half spoon portions forming a complete spoon bowl and the two table utensils combining to form a handle for the spoon.

EDMUND WILLIAM ABRAM.